July 27, 1965  E. MAILLET  3,197,383
NUCLEAR REACTOR FUEL ELEMENT
Filed Jan. 28, 1963  3 Sheets-Sheet 1

INVENTOR
Ennemond Maillet
BY Bacon + Thomas
ATTORNEYS

July 27, 1965  E. MAILLET  3,197,383
NUCLEAR REACTOR FUEL ELEMENT
Filed Jan. 28, 1963  3 Sheets-Sheet 3

INVENTOR

*Ennemond Maillet*

BY *Bacon & Thomas*
ATTORNEYS

United States Patent Office 3,197,383
Patented July 27, 1965

3,197,383
NUCLEAR REACTOR FUEL ELEMENT
Ennemond Maillet, Paris, France, assignor to Commissariat a l'Energie Atomique, Paris, France
Filed Jan. 28, 1963, Ser. No. 254,141
Claims priority, application France, Feb. 9, 1962, 887,617
8 Claims. (Cl. 176—81)

This invention relates to nuclear reactor fuel elements comprising a fuel element formed by a rod of fissile or fertile material enclosed in a finned can and disposed in a casing serving as a duct for for the heat cooling fluid.

The invention relates more particularly to elements of the type comprising a can provided with oblique fin sectors, which produce helical movement zones for the cooling fluid over the said sectors so as periodically to bring the fluid into contact with the said fins. This type includes fuel elements provided with cans having fins extending in the same directions over all the sectors so as to produce helical movements in the same direction of rotation, and also elements of the type provided with cans having herringbone fins which produce helical movements in opposite directions over two adjacent sectors.

The canned elements of this kind are conventionally supported by longitudinal partitions which are disposed radially and which serve to separate the flow sectors of the fins extending in the same directions or simply to center the rod in its duct, as is the case with herringbone-fin cans. The flow zones bounded by the element and the casing have dihedrons or "wedges" near the partitions, and they obstruct the helical movement of the fluid and produce irregularities in operation and considerable pressure losses. In addition, these partitions, which are generally made of light alloy in order substantially not to absorb the slow neutrons, have low mechanical strength at the operating temperatures and are subject to deformation which entails malfunctioning and the risk of accident.

The object of the present invention is to obviate these disadvantages by giving the duct-bounding casing and element an outline specially adapted to the helical flow around the fuel element, and by providing a structure adapted to hold the element rigidly in place despite stresses due to temperature fluctuations and radiation.

To this end, the invention provides a nuclear reactor fuel element comprising a fuel element formed by a rod of fissile or fertile material enclosed in a can provided with a plurality of longitudinal sectors of oblique fins with respect to the longitudinal axis of the fuel element and a casing in which the fuel element is held, a cooling fluid being capable of flowing between the casing and the element, characterised in that the inside wall of the casing has a transverse contour bounding lobes separated by teeth projecting radially inward and which form longitudinal radiating ribs which ensure centering of the element, the lobes formed in the casing co-operating with surfaces of the fuel element which have their concavity extending towards the lobes and each provided with at least one sector of fins so as to form peripheral ducts of rounded cross-section and large radius of curvature.

The invention also comprises various additional features which complement the first feature and which will be discussed more particularly in the following description of a number of examples of embodiment given by way of example without any limiting force.

The description refers to the accompanying drawings wherein.

Figure 7:
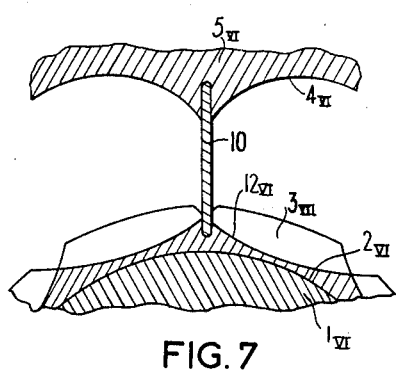
Figure 8:
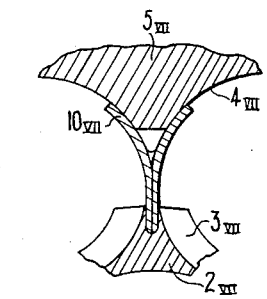
Figures 1A, 6:
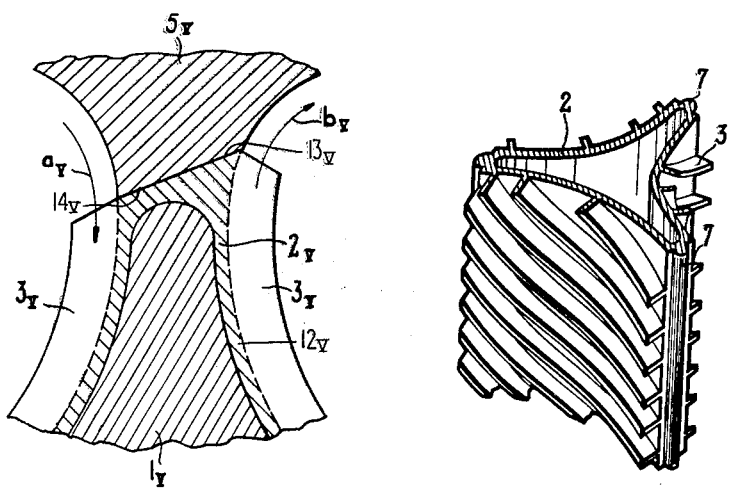
FIGURE 1a is a diagrammatic perspective view of a section of the can shown in FIGURE 1.

FIGURE 6 is a partial diagrammatic radial section showing another variant of the connecting sytem between the fuel element and the casing, FIGURE 7 is a partial diagrammatic radial section showing another variant of the connecting system between the fuel element and the casing, and FIGURE 8 is a similar view to FIGURE 7 showing another variant of the connecting system between the fuel element and the casing.

Figure 1:
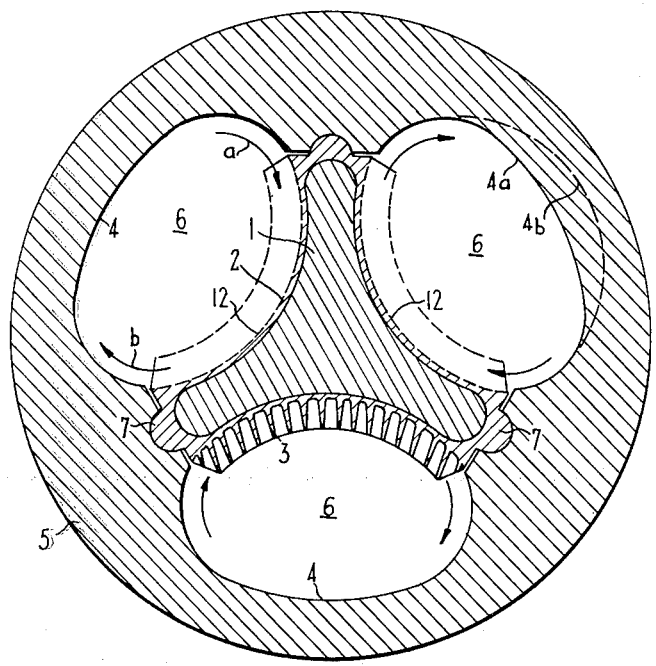
FIGURE 1 is a diagrammatic cross-section of a fuel element comprising an element of cruciform or three-armed star section, the fins being shown in section along the bottom duct and by their contour (in broken lines) along two other ducts.

The fuel element shown in cross-section in FIGURE 1 comprises an element in the form of a cruciform rod 1 of fissile or fertile material enclosed in a can 2 provided with fins 3. The latter are disposed obliquely with respect to the longitudinal axis of the element (FIGURE 1a) and guide the cooling fluid so as to impart a helical flow thereto; the flow of this fluid (generally $CO_2$) along the element is produced by means not shown.

The orientation of the peripheral speed of the streams of cooling fluid at the fin inlet may be represented on the drawing plane by arrows $a$; the fins release the cooling fluid in the directing of the arrows $b$. The helical flow is completed by following the inside contour of lobes 4 of the casing 5 which holds the element in place. The continuous curvatures given to the contour forms three lobes 4 which continue the concavities of the element 1 and enable the helical flow to be produced and maintained with the minimum resistance at the entry and exit of the grooves between the fins and in the whole of each duct 6.

The contour of the peripheral ducts 6 may be elliptical as shown at 4a (top right-hand duct in FIGURE 1) or be close to a circular form 4b, depending on the space available in the casing 5. The latter, which is generally formed by a moderator material such as graphite, may itself have a circular or polygonal outside contour, the circular shape being adopted, for example, when the casing is formed by a graphite jacket slid into a duct of the actual moderator pile.

The can 2 may be secured in position by a plurality of connections of the mortise-and-tenon type. Thus, the radial ends of the arms 12 of the can 2 and/or the can 2 itself are provided with lugs 7 or any other mechanical equivalent, such as slots, ribs, keys, etc., which on the one hand center the fuel element and on the other hand prevent its rotation about its axis. The fuel element may be designed to slide into the casing 5 for easy replacement within the reactor. It may also be held longitudinally with respect to the casing 5 by means of threaded collars, stops, screwed plates, keys or any other known system, the rod 1 and its casing 5 then forming a fuel element which can be moved en block during change-over or replacement of the fuel. Among other systems for connecting the element and the casing, the system described and claimed in United States Patent No. 3,100,743, issued August 13, 1963, is perfectly suitable for vertical-axis fuel elements, but other solutions can of course be used.

Figure 2:
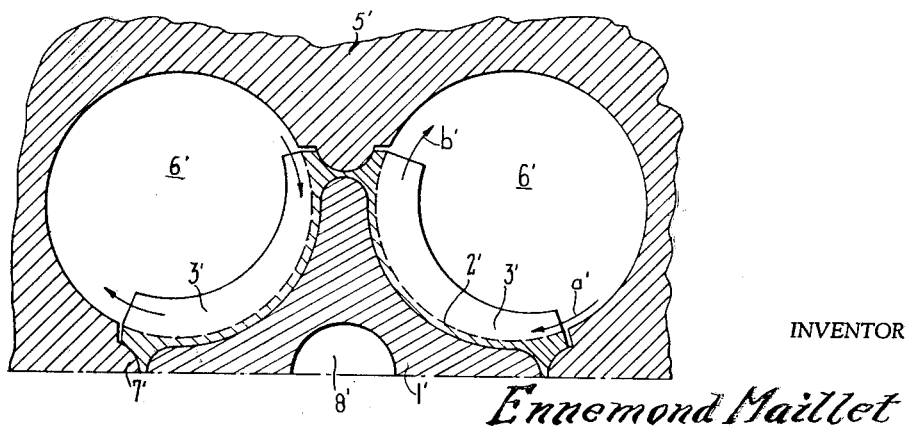
FIGURE 2 is a partial diagrammatic cross-section of a fuel element comprising a four-armed cruciform tubular rod.

Like elements in FIGURES 1 and 2 have the same reference numeral in the latter figure, but are followed by a prime.

The fuel element shown in half cross-section in FIGURE 2 comprises a four-armed cruciform element formed by a rod 1' pierced with a cylindrical axial cavity 8' and externally canned by means of can 2'.

The fuel element is formed in a similar manner to that shown in FIGURE 1 but the peripheral ducts 6' in this case have an approximately circular section.

Figure 3:
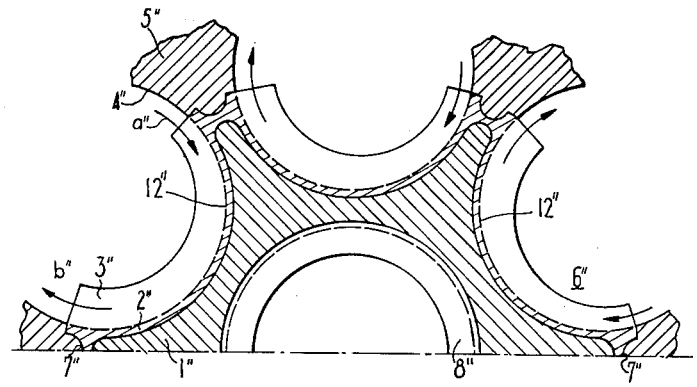
FIGURE 3 is a view similar to FIGURE 2 showing a cartridge with a six-armed cruciform tubular rod, canned internally and externally, the fins imparting a turbulent movement in the same direction in all the ducts to the cooling fluid.

FIGURE 3 uses the same reference numerals as FIGURES 1 and 2 to denote like elements, with a double prime to distinguish between them.

The element shown in partial cross-section in FIGURE 3 is designed for circulation of cooling fluid in an inner duct 8" and helical circulation in peripheral ducts as in the arrangements already described. Various types of internal fins may be adopted, the outer fins 3" preferably extending in the same oblique direction with respect to the longitudinal axis so as to give helical flows in the same directions. This arrangement, which was also adopted in the embodiments shown in the previous figures, is intended to cool all the arms 12" of the fuel element 1 equally. For all the arms, the fresh fluid entry in the direction of the arrow $a''$ compensates for the less active cooling produced by the fluid leaving the fins in the direction of the arrow $b''$ (FIGURE 3).

Figure 4:
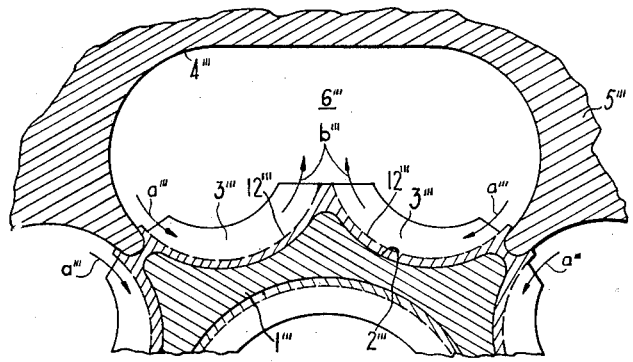
FIGURE 4 is a view similar to FIGURE 2 showing a fuel element comprising an eight-armed cruciform tubular rod canned internally and externally, the fins imparting a turbulent movement in opposite directions in two adjacent ducts to the cooling fluid (herringbone fins).

Conditions are not the same in the case of the fuel element shown in FIGURE 4. In this figure, those parts which correspond to parts already described are given the same reference numeral plus a triple prime. In FIGURE 4 it will be seen that the helical members 3''' are disposed in opposite directions in pairs. They can thus be combined in peripheral ducts the outline of which encloses two approximately contiguous circles.

Each duct formed by a lobe 4''' of the casing 5''' and two zones provided with fins 3''' of the outer can 2''' thus contain two flow steams. The helical flow in the direction of the arrows $a'''$ and $b'''$ in opposite directions are produced by oblique fins 3''' extending in opposite directions with a so-called herringbone arrangement. The effect of this is to balance the tangential forces due to the thrust of the heat vehicle fluid and correlatively reduce the stresses on the lugs connecting the fuel elements to their casing. The inequality of the dimensions of the arms 12''' has the effect of equalising the temperatures between those receiving the fluid in the direction of the arrows $a'''$, and which are more satisfactorily cooled, and those which are only licked by the fluid leaving in the direction of the arrows $b'''$.

Figure 5:
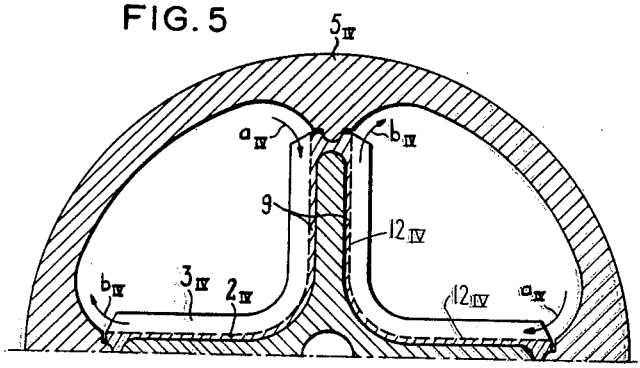
FIGURE 5 is a view similar to FIGURE 2 showing a fuel element which differs from the fuel element shown in FIGURE 2 by the shape of the arms of the fuel element.

FIGURE 5 (in which like elements again have the same reference numeral but with the index IV) shows a variant which is advantageous in certain cases, and wherein the arms $12_{IV}$ of the elements have planar walls 9 which are parallel in the embodiment shown by way of example; the casing $5_{IV}$ and the connection of the arms will then usually have rounded contours so that they do not depart unduly from a general elliptical or oval shape.

FIGURE 6 (in which like elements again have the same reference numeral with the index V) shows a fragmentary section of a variant of the system connecting the element $1_V$ and the casing $5_V$, intended for a fuel element in which the fins $3_V$ all extend in the same directions: the cooling fluid circulating in the direction of the arrows $a_V$ and $b_V$ then exerts a moment of rotation about the element axis on said element. The ends of the cans are then designed to have at the end of the arms $12_V$ inclined plane surfaces $13_V$ bearing on opposed abutting plane surfaces of the projecting parts $14_V$ of the casing $5_V$: the abutment of the element on the casing takes the rotary force.

This solution may also be adopted in other cases than that described, particularly when it is required to release the fuel element easily; in fact, just a slight rotation in the clockwise direction is sufficient to separate the element $1_V$ from the casing $5_V$.

FIGURE 7 (in which the elements corresponding to others already shown have the same reference numeral plus the index VI) is a very partial section of a fuel element in which the peripheral ducts formed around the fuel elements $1_{VI}$ and in the casing $5_{VI}$ have an imperfect rounded or circular shape. The connection between can $2_{VI}$ of the fuel elements and the casing is indirect in this case, a radial strut 10 being interposed between the arms $12_{VI}$ of the element and the projecting parts of the casing. The figure shows that the concave parts are still favourable to helical flow in each of the ducts and that the struts 10 may be short and securely fixed, i.e., again very sturdy.

FIGURE 8, in which the reference numerals correspond to those in FIGURE 7, but with the index VII employed is a modification incorporating a variant of the struts 10 to provide high resistance to radial and torsional forces; other forms may be imagined for centering the elements and possibly bounding the ducts.

The same principles of rounded contour for the ducts and direct support of the element may be applied to reactors in which the cooling fluid has no contact with the moderator, which may then be fluid. This is particularly the case with reactors of the pressure tube type taking the pressure of the cooling fluid. The components forming the casing and centering the element may be either metal or refractory (particularly when it is necessary to prevent heat transfer to the exterior).

To give the fins better control of the circulation, it may be advantageous to give them a variable height increasing from the inlet edge to the outlet edge as shown in FIGURES 2 to 4. This construction gives a better hold at the inlet edge which is subject to maximum mechanical stresses, since it reduces the overhang.

Means outside the fins may in some cases be used to produce or promote the formation of helical flows.

When the can and the fins are of a material which is a relatively poor conductor, the fins need not be very high.

The cooling fluid may be a medium-temperature or high-temperature gas, in which case there are special construction conditions; the said fluid may also be a liquid or a mixture of gas and liquid phases which may or may not be brought to boiling point.

Generally, the invention covers modification of the type of fuel elements given as an example, the details of their outline, that of their cans and the shapes of the walls of the outside duct.

What I claim is:

1. A nuclear reactor fuel cartridge comprising: a fuel element comprised of a rod of fuel material enclosed within a can; a casing surrounding said fuel element, the inner surface of said casing and the external surface of said can being formed with a plurality of opposed concave surfaces cooperating to define therebetween a plurality of cooling gas passages, said concavities on the external surface of said can each being provided with a longitudinally extending set of fins each disposed obliquely with respect to the axis of said can, said fins cooperating respectively with the opposed concavity on the internal surface of said casing to impart a helical flow to gas moving along the passage defined therebetween; and means provided between adjacent concavities on said can for engagement with portions of said casing between adjacent concavities on the internal surface of said casing for centering said can with respect to said casing.

2. A nuclear reactor fuel cartridge as defined in claim 1 wherein said can is of a generally star-shaped cross-sectional configuration comprising at least three arms, each pair of adjacent arms defining one of said concavities on the external surface of said can for cooperation with an opposed concavity on the internal surface of said casing to define one of said cooling gas passages.

3. A nuclear reactor fuel cartridge as defined in claim 2 wherein all of said fins are inclined in the same direction with respect to the axis of said fuel element whereby to produce helical flow paths in the same direction in all of said passages.

4. A nuclear reactor fuel cartridge as defined in claim 2 wherein said can is of a generally star-shaped cross-sectional configuration having an even number of arms, the two concavities disposed between three adjacent arms on the external surface of said can cooperating with a single concavity on the internal surface of said casing to define a duct, the fins provided in one of said two concavities being inclined in the opposite direction with respect to the axis of said fuel element as the fins provided in the other of said two concavities to thereby produce two helical flows having opposite directions of rotation.

5. A nuclear reactor fuel cartridge as defined in claim 1 wherein said means for centering said can comprises a plurality of radial struts interconnecting said arms of said fuel element with opposed portions of said casing.

6. A nuclear reactor fuel cartridge as defined in claim 1 wherein said can is of a generally star-shaped cross-sectional configuration having a plurality of arms, said arms being provided with parallel planar side wall surfaces over the major portion of the radial development.

7. A nuclear reactor fuel cartridge as defined in claim 1 wherein said means for centering said can comprises a plurality of connections of the mortise-and-tenon type disposed between adjacent pairs of opposed concavities on the external surface of said can and internal surface of said casing, respectively.

8. A nuclear reactor fuel cartridge as defined in claim 1 wherein said means for centering said can with respect to said casing comprises a plurality of connections consisting of opposed pairs of inclined plane surfaces disposed in an abutting relation on the external surface of said can on the internal surface of said casing between adjacent concavities thereof, whereby said can can be released by a rotary movement separating the respective pairs of inclined plane surfaces.

References Cited by the Examiner

UNITED STATES PATENTS

| 2,902,422 | 9/59 | Hutter | 176—81 |
| 2,985,575 | 5/61 | Dennis et al. | 176—77 |
| 3,063,925 | 11/62 | Huet | 176—83 |
| 3,116,213 | 12/63 | Ritz | 176—81 |

FOREIGN PATENTS

| 847,216 | 9/60 | Great Britain. |
| 915,331 | 1/63 | Great Britain. |

CARL D. QUARFORTH, *Primary Examiner.*